United States Patent [19]

Lidy et al.

[11] Patent Number: 4,831,076

[45] Date of Patent: May 16, 1989

[54] PREPARATION OF POLYMER POLYOLS

[75] Inventors: Werner A. Lidy, Geneva; Huy P. Thanh, Onex, both of Switzerland

[73] Assignee: BP Chemicals Limited, London, England

[21] Appl. No.: 726,626

[22] Filed: Apr. 24, 1985

[30] Foreign Application Priority Data

Apr. 24, 1984 [GB] United Kingdom ................ 8410480

[51] Int. Cl.$^4$ .......................... C08K 3/02; C08K 3/38; C08K 5/55
[52] U.S. Cl. .................................... 524/701; 524/762; 521/156; 521/157
[58] Field of Search ................ 524/701, 762; 521/156, 521/157

[56] References Cited

U.S. PATENT DOCUMENTS

Re. 28,715  2/1976  Stamberger ...................... 521/156
4,588,830   5/1986  Fisk et al. ......................... 556/52

Primary Examiner—John Kight
Assistant Examiner—M. L. Moore
Attorney, Agent, or Firm—Brooks, Haidt, Haffner & Delahunty

[57] ABSTRACT

A modified polyol, suitable for use as a non-aqueous dispersant in the preparation of polymer/polyols containing high levels of polymer, is provided. The modified polyol comprises the product obtained by reaction of a polyol with a coupling agent having at least two functional groups which are reactable with hydroxyl groups on the polyol. Suitable coupling agents include silicon compounds having two such functional groups, organic compounds having two or more alkoxy groups, saturated dicarboxylic acid derivatives, alkyl or aryl esters of carbonic acid, alkyl or aryl sulphonates, boric acid or its esters and titanates.

19 Claims, No Drawings

PREPARATION OF POLYMER POLYOLS

The present invention relates to novel modified polyols which can be used in the preparation of polymer/polyols, sometimes termed polymeric polyols or graft polyols. The present invention also relates to processes by which such modified polyols are prepared and to processes which produce and use the polymer/polyols derived from the modified polyols. In particular the present invention relates to novel modified polyether and their use in the above applications.

The reaction between a polyfunctional isocyanate and a polyfunctional alcohol to produce polyurethane foams, elastomers, resins and the like is a well known chemical reaction which is commercially exploited on a large scale. Commercial polyurethane manufacture in general involves the reaction between a polyfunctional isocyanate and a polyfunctional alcohol such as a polyether polyol. Such polyether polyols are made from a polyfunctional low molecular weight alcohol onto which has been added a polyalkylene oxide chain. The polyalkylene oxide chain is typically prepared from ethylene oxide, propylene oxide or a mixture thereof in a random or block form.

In recent years, the use of polyether polyols of the type described above has been in some areas superseded by polyether polyols containing additional polymeric matter. These polyether polyols, known as polymer/polyols have been described in U.S. Pat. No. 3,304,273, U.S. Pat. No. 3,383,351, U.S. Pat. No. Re. 28,715 and U.S. Pat. No. Re. 29,118. In general, such polymer/polyols have been prepared by polymerising one or more olefinically unsaturated monomers dispersed in the polyether polyol in the presence of a free radical catalyst. The polymer/polyols produced by this process, which are thought to comprise a polymer or copolymer of the monomers at least partially grafted to the polyether polyol, have the important advantage of importing to the final polyurethane improved load-bearing properties as compared with earlier polyether polyols.

The need to obtain polyurethanes with further improved load-bearing properties has meant that recently attempts have been made to improve polymer/polyols further. In particular developments of polymer/polyols has centred around increasing the polymer content whilst still maintaining the polymer/polyol in the form of a low viscosity fluid having a resistance to polymer sedimentation.

In order to produce stable low viscosity polymer polyols, it has been proposed to introduce during the polymerisation an extra component termed a non aqueous dispersant (NAD) stabiliser. The NAD stabiliser comprises a polyol or polyether polyol, containing deliberately added unsaturation, which copolymerises or grafts to the growing polymer chains thereby forming a steric hinderance which prevents the agglomeration of particles.

An example of such an NAD stabiliser is given in U.S. Pat. No. 3,823,201 where there is disclosed an unsaturated polyether polyol obtained by the reaction of a polyether polyol with the anhydride of an unsaturated acid, for example maleic anhydride. In this case, the anhydride of the unsaturated acid reacts with a free hydroxyl group on the polyether polyol to produce a polyether polyol having from about 0.10 to 0.70 mole of unsaturation per mole of polyol.

Similar methods of introducing unsaturation into a polyether polyol thereby forming a NAD stabiliser are disclosed in U.S. Pat. No. 4,198,488, GB No. 1,411,646 and EP No. 6605.

It has now been found that polymer/polyols having favourable viscosity and resistance to sedimentation at high solids content can be prepared by polymerising one or more monomers having olefinic unsaturation in a polyether polyol containing a novel NAD stabiliser.

Accordingly, the present invention provides a modified polyol suitable for use as an NAD stabiliser characterised in that the modified polyol is prepared by reacting a polyol with a coupling agent comprising a compound having at least two functional groups which are reactable with hydroxyl groups on the polyol.

It is a feature of the NAD stabilisers of the present invention that, by using a coupling agent having at least two functional groups which are reactable with hydroxyl groups, the need to have any additional unsaturation in the coupling agent is avoided. Additional unsaturation however can also be present if desired to improve further the characteristics of the final NAD stabiliser.

The mechanism by which the NAD stabilisers of the present invention act is not understood in any detail. However, without being held to a particular mechanism, it is thought that the coupling agent couples together polyol molecules to form an extended network. Such a network is able, during the preparation of the polymer/polyol, to prevent aggregation of polymeric material into particles large enough to sediment or modify the viscosity of the final product.

The polyols used in the preparation of the NAD stabiliser can be for example polyalkylene polyether polyols, polyhydroxyl containing polyesters, polyhydroxy terminated polyurethane polymers, polyhydric polythioethers, and the like. A preferred class of polyol is the polyalkylene polyether polyols, usually called polyether polyols, of which the following sub-classes are the most preferred (a) alkylene oxide adducts of non-reducing sugars and their derivatives (b) alkylene oxide adducts of polyphenols (c) alkylene oxide adducts of polyhydroxyalkanes.

The polyether polyol used should have a number average molecular weight in excess of 400 and a hydroxyl number in the range 20 to 280. Terms such as number average molecular weight and hydroxyl number will be familiar to those skilled on the art.

Most preferably the polyether polyol is a poly(ethylene oxide and/or propylene oxide) adduct of one of the following polyhydric alcohols; glycerol, trimethylolpropane, diethylene glycol, the isomeric butanetriols, pentanetriols and hexanetriols, and pentaerythritol.

As regards the coupling agent this can, in principle, be any molecule having two or more functional groups which are able to react with the hydroxyl groups on the polyol providing that the coupling agent itself is not further degradable or decomposable by the polyol or under the conditions of the coupling reaction.

The coupling agent can be a silicon containing compound which has at least two functional groups capable of reacting with hydroxyl groups are attached to a silicon atom. A preferred groups of such silicon containing compounds are those having the generic formula $R_mSi(x)4-m$ where m is an integer from 0 to 2, the R groups are independently saturated hydrocarbyl groups or hydrogen and the x groups are independently —OH, —OR$^1$, where R$^1$ is a C$_1$ to C$_{10}$ hydrocarbyl group, or halogen. Preferably the R groups are substituted or unsubstituted C$_1$ to C$_{10}$ alkyl groups. Examples of silicon compounds which are preferred include tetraethoxysilane, tetramethoxysilane, tetrachlorosilane, trichlorosilane.

Another preferred class of silicon compound are those having the formula R$_m$Si((OSiR$_2$)$_n$X)$_{4-m}$ where m, R and X are a described previously and where n is an integer greater than 0.

The coupling agent may also be an organic compound having two or more alkoxyl groups halide groups, carboxylic acid groups, carboxylic acid halide groups, carboxylic acid ester groups, carbonic acid ester groups, alkyl or aryl sulphonate groups, and the like. Functional groups such as anhydrides, which react with two hydroxyl groups, can be used even in the absence of unsaturation.

One particular class of such coupling agents are compounds containing two or more alkoxy groups. Examples of such compounds include tetraalkyloxyalkanes e.g. tetramethylorthocarbonate and tetraethylorthocarbonate, trialkoxyalkanes e.g. triethoxyorthoformate and dialkoxyalkanes having the formula (R)(R$^1$)(OR$^2$)(OR$^3$) where R, R$^1$, R$^2$ and R$^3$ are independently alkyl or aryl hydrocarbyl radicals having preferably less than 20 carbon atoms and where R and R$^1$ may also be hydrogen atoms. An example of these compounds is 1,1-dimethoxy ethane.

Another preferred class of such coupling agents are those compounds having at least two halide groups for example C$_1$-C$_{20}$ dihaloalkanes such as 1,2 dibromoethane.

Saturated carboxylic acids and their derivatives having two or more carboxylic acid groups can also be used even though they possess no unsaturation which is reactive under polymerisation conditions. Thus acids such as phthalic acid, oxalic acid, malonic acid, succinic acid, glutaric acid, malic acid and tartaric acid and their derivatives can be used. Carboxylic acids having only one acid group but in addition another functional group reactive with a polyol, e.g. the ethers of glycollic and lactic acid, can also be used.

The coupling agent can also be an alkyl or aryl ester of carbonic acid e.g. dimethyl carbonate, diethyl carbonate and diphenyl carbonate.

Although they do not possess two functional groups which are reactable with the hydroxy groups of the polyol, aldehydes and ketones can also be used as coupling agents as the C=O double bond act as two functional groups. Preferred examples are formaldehyde, acetaldehyde and glyoxal.

The last preferred group of such coupling agents is the alkyl or aryl sulphonates having two or more sulphonate groups. Alkyl sulphonyl halides and alkyl sulphates can also be used.

Finally in addition to the coupling agents described above, it is possible to use boric acid or its esters and titanates, trimethyl borate and the like. Preferred titanates are tetraalkoxyorthotitanes.

In another embodiment of the invention described above there is provided a process for the preparation of the NAD stabiliser. Typically the NAD stabiliser is prepared by reacting the coupling agent with the polyol in an inert solvent, for example toluene, at a temperature in the range 60° to 160° C., preferably 100° to 120° C. The reaction is preferably carried out in the presence of a transesterification or transetherification catalyst for example, trifluoroacetic acid/sodium acetate mixtures or an amidine or guanidine catalyst. When an acid catalyst is used it may be necessary to add a neutralisation agent, for example sodium bicarbonate, at the end of the reaction.

The reaction between the coupling agent and the polyol may be carried out as described above, however, where the reaction involves a halide compound or an alkyl or aryl sulphonate it may be necessary to form an alkali metal salt of the polyol prior to reaction with the coupling agent by, for example, treating the polyol with an alkali metal.

The NAD stabiliser produced by reactions of the type described above have preferably a viscosity in the range 500-4000 cps at 25° C. In addition the NAD stabiliser should have less than 0.8% by weight preferably 0.3 to 0.7% by weight induced unsaturation.

As mentioned earlier, the NAD stabilisers described above are particularly useful for preparing polymer/polyols containing high levels of polymer. Thus in another aspect of the present invention there is provided a process for the preparation of a fluid polymer/polyol which process comprises polymerising one or more monomers in a liquid polyol under polymerisation conditions and in the presence of a free radical catalyst characterised in that the liquid polyol comprises (1) a base polyol and (2) an NAD stabiliser of the type described above.

The base polyol used in the preparation of the polymer/polyol may be any of the polyols described earlier in relation to the NAD stabiliser or a mixture thereof. The base polyols should have viscosities in the range 100-5000 centipoise at ambient temperature, preferably in the range 100-2000 centipoises.

During the preparation of the polymer/polyol, a polymer is produced in the liquid base polyol by polymerisation of the monomer or monomers. The monomers used are suitably vinyl monomers for example styrene, acrylonitrile, methacrylonitrile and methyl methacrylate. Preferably a mixture of styrene and acrylonitrile are used to produce a copolymer. The final polymer/polyol is suitably one having more than 20% by weight polymer present and is preferably one having between 30 and 70% by weight polymer. As regards the relative amounts of styrene and acrylonitrile in the copolymer it is desirable for reasons of cost to be able to maximise the level of styrene present. Preferably the copolymer should contain 50 to 100% styrene on a molar basis.

The polymerisation reaction occuring during the preparation of the polymer/polyol is initiated by means of a free radical initiator. The free radical initiator can be any of those which are routinely used in vinyl polymerisation reactions including peroxides, perborates, persulphates, percarbonates and azo compounds. Typical examples of such free radical initiators include alkyl and aryl hydroperoxides, dialkyl and diaryl peroxides, dialkylperoxydicarbonates and azobis(nitriles). Preferred free radical initiators are azobis(isobutyronitrile) and bis(4-tertbutyl cyclohexyll peroxydicarbonate (Perkadox).

The polymer/polyols produced using the NAD stabilisers of the present invention are useful in the preparation of polyurethanes, particularly polyurethane foams. Such polyurethane foams have improved tensile strength and load bearing without impairment of the other physical parameters associated with the product. Accordingly there is also provided a process for the production of a polyurethane foam by reacting a polyfunctional isocyanate with a polymer/polyol of the type described above in the presence of
(a) a catalyst for the urethane forming reaction,
(b) a blowing agent and
(c) a foam stabiliser Polyfunctional isocyanates which can be used to advantage include diisocyanatoalkanes, e.g. 1,2-diisocyanatoethane, 1,3-diisocyantopropane, the isomeric benzene, xylene and toluene diisocyanates, MDI and the like.

Catalysts which can be used to accelerate the urethane forming reaction will likewise be familiar to those skilled in the art. These include amines, phophines, strong inorganic bases, titanate, silicate and stannate esters and organo tin derivatives.

As regards blowing agents and foam stabilisers the range of materials which can be used will be familiar to the skilled man. Thus suitable blowing agents include water and halogenated hydrocarbons of low molecular weight.

The process may be carried out batchwise or continuously.

The invention is now illustrated by the following examples.

PREPARATION OF NAD STABILISER

EXAMPLE 1

Triethoxymethylsilane as coupling agent

A two liter reactor fitted with a mechanical stirrer, a thermometer and a Dean Stark apparatus lopped by a condensor was charged with a blend of trifluoroacetic acid (1.38 g 12 mmoles), potassium acetate (0.69 g, 6.9 mmoles), toluene (400 ml), a polyether polyol (970 g glycerol started, PO: 86%, EO 14%, HW: 3500, OH number 46.0 mg KOH/g. BP Product Polyurax U10-01) and triethoxymethylsilane (16.5 g, 92 mmoles).

The reaction mixture was then heated to 110° C. for 2 hours. During this time the transetherification reaction between the polyether polyol and the triethoxymethylsilane took place producing the NAD stabiliser and ethanol. At 110° C. a toluene/ethanol azeotrope started to boil and was removed by distillation through the Dean Stark apparatus. By monitoring the levels of ethanol in the distillate using gas chromatography, it was found the reaction was practically complete in two hours.

EXAMPLE 2

Tetraethoxy silane as coupling agent.

A four liter reactor vessel equipped as described in Example 1 was charged with a blend of polyether (2000 g, glycerol started, PO: 86%, EO: 14%, MW: 3500, OH Number: 46.0 mg KOH/g. BP Product: Polyurax U10-01), trifuloracetic acid (2.8 g, 24 mmoles) potassium acetate (1.40 g, 14 mmoles) and tetraethoxysilane (26.5 g, 126 mmoles).

The reaction was carried out as described in Example 1 for 3 h, then the mixture was neutralized with sodium bicarbonate (20.0 g, 238 mmoles). Solvent was then removed and the product filtered. It has a viscosity of 24,000 cps at 25° C., on OH number of 33.2 mg KOH/g an acid number of 0.0009 mg KOH/g and an average MW of 17,300.

EXAMPLE 3

Triethylorthoformate as coupling agent

A one liter vessel equipped as described in Example 1 was charged with a blend of polyether (500 g, glycerol started, PO: 86%, EO: 14%, MW: 3500, OH Number: 46.0 mg KOH/g, BP Product: Polyurax U10-01) and toluene (200 ml). Residual water in the polyol was removed by azeotropic distillation. To this blend, was added trifluoroacetic acid (0.7 g, 6 mmoles), potassium acetate (0.35 g, 3.5 mmoles) and triethylorthformate (14.1 g, 95 mmoles).

The reaction was carried out as described in Example 1 for 5 h, then the mixture was neutralized with sodium bicarbonate (5 g, 59 mmoles). Solvent was then removed and the product filtered. It had a viscosity of 84,000 cps at 25° C., an OH number of 33.9 mg KOH/g and an average MW of 14200.

EXAMPLE 4

Tetraethoxyorthotitanate as coupling agent

A one liter vessel equippped as described in Example 1 was charged with a blend of polyether (500 g, glycerol started, PO: 86%, EO: 14%, MW: 3500, OH Number: 46.0 mg KOH/g. BP Product: Polyurax U10-01) and toluene (200 ml). Residual water in the polyol was removed by azeotropic distillation. To this blend, was added tetraethoxy orthotitanate (7.2 g, 30 mmoles).

The reaction was carried out as described in Example 2 for 3 h, and the solvent was then removed by vacuum distillation.

EXAMPLE 5

Tetrachlorosilane as coupling agent

A four liter vessel equipped as described in Example 1 was charged with a blend of polyether (2000 g, glycerol started, PO: 86%, EO: 14%, MW: 3500, OH Number: 46.0 mg KOH/g. BP Product: Polyurax U10-01) and toluene (800 ml). Residual water in the polyol was removed by azeotropic distillation. To this blend, was added tetrachlorosilane (14 g, 93.6 mmoles.

The mixture was then heated with stirring at 60° C. for 5 h. Solvent and hydrogen chloride released were then removed by vacuum distillation and the product was used as such without further acid trace neutralization. It had a viscosity of 6200 cps at 25° C., an acid number of 0.0013 mg KOH/g. an OH number of 36.0 mg KOH/g and an average MW of 11300.

EXAMPLE 6

Trichlorosilane as coupling agent.

An autoclave equipped with a thermometer, stirrer, heat exchange means was charged with a polyether (300 g, glycerol started, PO: 86%, EO: 14%, MW: 3500, OH Number: 46.0 mg KOH/g. BP Product: Polyurax U10-01), toluene (150 ml) and trichlorosilane (3.80 g, 85 mmoles).

The mixture was stirred at 65° C. for 5 h. Solvent and hydrogen chloride were then removed by vacuum distillation and the product was used as such without further neutralization. It had an OH number of 40.0 mg KOH/g.

PREPARATION OF COPOLYMER DISPERSION

COMPARATIVE EXPERIMENT A

Use of Polyol without added stabilizer

In a one liter reactor equipped as described above, was charged a base polyether (210 g of the above example, without any added stabilizer. With stirring and under a slight nitrogen flow, the charge was heated to 125° C., and a stream of styrene (90.65 g, 21%), acrylonitrile (38.85 g, 9%) and a polymerization initiator (Perkadox P-16, 2.65 g, 0.5%) dispersed in the above described polyether (90.0 g) was continuously added to the charge during two hours period. Before completion of the addition, a completely coagulated mass of polymer was obtained, blocking the stirrer.

EXAMPLE 7

In a one liter reactor equipped with a thermometer, stirrer, dropping funnel and heat exchanger, was charged with a blend of a base polyether (210 g, glycerol started, PO: 86%, EO: 14%) and the stabilizer of Example 2 (26.5 g, 5%). With stirring and under a slight nitrogen flow, the charge was heated to 125° C., and a stream of styrene (141.2 g, 26.6%), acrylonitrile (60.5 g, 12%) and a polymerization initiator (Perkadox P-16, 2.65 g, 0.5%) dispersed in the above described base polyether (90.0 g) was continuously added to the charge during two hours period. Upon completion of addition, the reaction mixture was maintained at 125° C. for 1 hour. The reaction mixture was then stripped of volatiles for two hours at 110° C., under less than 10 mm of mercury. The stripped reaction product, a white opaque stable dispersion, had a viscosity of 5500 cps at 25° C.

EXAMPLE 8

All polystyrene polymer dispersion

In a one liter reactor equipped as described in Example 8, was charged with a blend of a base polyether (of Example 8, 210 g), and the stabilizer of Example 2 (28.30 g, 5%). With stirring and under a slight nitrogen flow, the charge was heated to 125° C., and a stream of styrene (232 g, 41%), and a polymerization initiator (azobisisobutyronitrile, AIBN, 5.66 g, 1%) dispersed in the above base polyether (90 g) was continuously added to the charge during two hours period. Upon completion of addition, the reaction mixture was maintained at 125° C. for 1 hour. The reaction mixture was then stripped of volatiles for two hours at 110° C., under less than 10 mm of mercury. The stripped reaction product, a white opaque stable dispersion, (38% polymer), has a viscosity of 2000 cps at 25° C.

EXAMPLE 9

All polystyrene polymer dispersion

In a one liter reactor equipped as described in Example 8, was charged with a blend of a base polyether (of Example 8, 210 g), and the stabilizer of Example 2 (28.30 g, 5%). With stirring and under a slight nitrogen flow, the charge was heated to 125° C., and a stream of styrene (232 g, 41%), and a polymerization initiator (azobisisobutyronitrile, AIBN, 5.66 g, 1%) dispersed in the above base polyether (90 g) was continuously added to the charge during two hours period. Upon completion of addition, the reaction mixture was maintained at 125° C. for 1 hour. The reaction mixture was then stripped of volatiles for two hours at 110° C., under less than 10 mm of mercury. The stripped reaction product, a white opaque stable dispersion, (37% polymer), had a viscosity of 2500 cps at 25° C.

In the above examples the abbreviations h, cps stand for hours and centipoise respectively.

The above examples show that the modified polyether polyols are suitable for preparing stable acrylonitrilestyrene polymer polyols in excess of 30% w/w polymer content without a highly viscous product being formed.

We claim:

1. A modified polyol suitable for use as an NAD stabiliser characterised in that the modified polyol is prepared by reacting a polyol with a coupling agent, comprising a compound having at least two functional groups which are reactable with hydroxyl groups on the polyol.

2. A fluid polymer/polyol dispersion prepared by polymerising, in the presence of a free radical catalyst one or more monomers in a liquid polyol under polymerisation conditions characterised in that the liquid polyol comprises:
   (a) a base polyol
   (b) a modified polyol prepared by reacting a polyol with a coupling agent comprising a compound having at least two functional groups which are reactable with hydroxyl groups on the polyol.

3. A fluid polymer/polyol as claimed in claim 2 characterised in that the coupling agent is a silicon containing compound which has at least two functional groups attached to the silicon atom which are reactable with hydroxyl groups.

4. A fluid polymer/polyol as claimed in claim 3 characterised in that the silicon containing compound in a compound having the formula $R_mSi(X)_{4-m}$ where (a) m is an integer from 0 to 2, (b) the R groups are independently saturated hydrocarbyl groups or hydrogen and (c) the X groups are independently —OH, —OR$^1$ where R$^1$ is a C$_1$ to C$_{10}$ hydrocarbyl group are, or halogen.

5. A fluid polymer/polyol as claimed in claim 4 characterised in that the silicon containing compound is selected from the group consisting of tetraethoxysilane, tetramethoxysilane, tetrachlorosilane and trichlorosilane.

6. A fluid polymer/polyol as claimed in claim 2 characterised in that the coupling agent comprises an organic compound having two or more alkoxy groups.

7. A fluid polymer/polyol as claimed in claim 6, characterised in that the coupling agent is selected from the group consisting of tetraalkyl orthoformates, trialkoxyalkanes and dialkoxyalkanes.

8. A fluid polymer/polyol as claimed in claim 6 characterised in that the coupling agent is selected from the group consisting of tetramethylorthocarbonate, tetraethylorthocarbonate 1,1-dimethoxy ethane and triethoxyorthoformate.

9. A fluid polymer/polyol as claimed in claim 2 characterised in that the coupling agent is a dihaloalkane.

10. A fluid polymer/polyol as claimed in claim 2 characterised in that the coupling agent is a saturated carboxylic acid or derivative thereof having two or more carboxylic acid groups.

11. A fluid polymer/polyol as claimed in claim 2 characterised in that the coupling agent is an alkyl or aryl ester of carbonic acid.

12. A fluid polymer/polyol as claimed in claim 2 characterised in that the coupling agent is selected from the group consisting of alkyl or aryl sulphonates having two sulphonate groups, alkyl sulphonyl halides having two sulphonyl halide groups and alkyl sulphate having two sulphate groups.

13. A fluid polymer/polyol as claimed in claim 2 characterised in that the coupling agent is boric acid or an ester thereof.

14. A fluid polymer/polyol as claimed in claim 2 characterised in that the coupling agent is a titanate.

15. A fluid polymer/polyol as claimed in claim 14 characterised in that the titanate is a tetraalkoxyorthotitanate.

16. A fluid polymer/polyol as claimed in claim 2 characterised in that the monomers used in the polymerisation reaction are styrene and acrylonitrile.

17. A fluid polymer/polyol as claimed in claim 16 characterised in that the fluid polymer/polyol contains more that 20% by weight polymer.

18. A fluid polymer polyol as claimed in claim 17 characterised in that the fluid polymer/polyol contains between 30 and 70% by weight polymer.

19. A fluid polymer polyol as claimed in claim 18 characterised in that the polymer contains 50 to 100% styrene on a molar basis.

* * * * *

UNITED STATES PATENT AND TRADEMARK OFFICE
CERTIFICATE OF CORRECTION

PATENT NO. : 4,831,076

DATED : May 16, 1989

INVENTOR(S) : WERNER A. LIDY et al

It is certified that error appears in the above-identified patent and that said Letters Patent is hereby corrected as shown below:

Col. 5, l. 15, correct spelling of "phosphines,"

Col. 5, l. 59, correct spelling of "trifluoracetic"

Signed and Sealed this

Thirteenth Day of March, 1990

Attest:

JEFFREY M. SAMUELS

*Attesting Officer*  *Acting Commissioner of Patents and Trademarks*